(12) United States Patent
Sheridan (10) Patent No.: US 9,976,490 B2
(45) Date of Patent: May 22, 2018

(54) GEARED GAS TURBINE ENGINE WITH OIL DEAERATOR (71) Applicant: William G. Sheridan, Southington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 471 days.

(21) Appl. No.: 14/737,670

(22) Filed: Jun. 12, 2015

(65) Prior Publication Data
US 2016/0017812 A1 Jan. 21, 2016

Related U.S. Application Data (60) Provisional application No. 62/019,452, filed on Jul. 1, 2014.

(51) Int. Cl.
F02C 7/14 (2006.01)
F01D 25/20 (2006.01)
F02C 7/36 (2006.01)
F02C 3/04 (2006.01)
F02C 7/06 (2006.01)
(Continued)

(52) U.S. Cl.
CPC ............... *F02C 7/36* (2013.01); *F01D 25/20* (2013.01); *F02C 3/04* (2013.01); *F02C 7/06* (2013.01); *F16N 39/002* (2013.01); *F01M 2013/0427* (2013.01); *F05D 2260/40311* (2013.01); *F05D 2260/608* (2013.01); *F05D 2260/98* (2013.01); *Y02T 50/671* (2013.01)

(58) Field of Classification Search
CPC .... F02C 7/14; F02C 7/36; F02C 3/113; F02C 3/10; F02C 3/107; F05B 2260/40311; F01D 25/18; F01D 25/20
See application file for complete search history.

(56) References Cited

U.S. PATENT DOCUMENTS 5,472,383 A * 12/1995 McKibbin ........... F16H 57/0482
184/6.12
6,223,616 B1 * 5/2001 Sheridan ............... F16H 1/2827
184/6.12
(Continued)

FOREIGN PATENT DOCUMENTS

EP 1166841 A2 1/2002

OTHER PUBLICATIONS

European Search Report for European Application No. 15174299.6 completed Nov. 11, 2015.

*Primary Examiner* — Seth W Mackay-Smith
(74) *Attorney, Agent, or Firm* — Carlson, Gaskey & Olds, P.C.

(57) ABSTRACT

A gas turbine engine comprises a fan drive turbine for driving a gear reduction. The gear reduction drives a fan rotor. A lubrication system supplies oil to the gear reduction. The lubrication system includes a lubricant pump supplying a mixed air and oil to a deaerator inlet. The deaerator includes a separator that for separating oil, and delivering separated air to an air outlet, and for delivering separated oil back into an oil tank. The separator includes a member having lubricant flow paths on both of two opposed sides. A method of designing a gas turbine engine is also disclosed.

7 Claims, 6 Drawing Sheets (51) Int. Cl.
*F16N 39/00* (2006.01)
*F01M 13/04* (2006.01)

(56) References Cited

U.S. PATENT DOCUMENTS

| | | | | |
|---|---|---|---|---|
| 8,500,869 B1* | 8/2013 | Johnson | ............ | B04C 5/181 |
| | | | | 184/6.23 |
| 2009/0272603 A1* | 11/2009 | Belik | ............ | F16N 7/32 |
| | | | | 184/6.11 |
| 2013/0068562 A1* | 3/2013 | Cornet | ............ | F01M 11/12 |
| | | | | 184/6.4 |
| 2014/0140824 A1* | 5/2014 | Sheridan | ............ | F01D 25/16 |
| | | | | 415/170.1 |

* cited by examiner

GEARED GAS TURBINE ENGINE WITH OIL DEAERATOR

CROSS-REFERENCE TO RELATED APPLICATION

This application claims priority to U.S. Provisional Patent Application No. 62/019,452, filed Jul. 1, 2014.

BACKGROUND OF THE INVENTION

This application relates to a gas turbine engine having a gear reduction driving a fan wherein an oil tank has an improved deaerator.

Gas turbine engines are known and, typically, include a fan delivering air into a bypass duct as propulsion air. The fan also delivers air into a core engine where it passes to a compressor. The air is compressed in the compressor and delivered downstream into a combustion section where it is mixed with fuel and ignited. Products of this combustion pass downstream over turbine rotors driving them to rotate.

Historically, the fan rotor and a fan drive turbine rotor have been driven at the same speed. This placed a restriction on the desirable speed of both the fan and the fan drive turbine.

More recently, it has been proposed to provide a gear reduction between the fan drive turbine and the fan rotor.

The gear reduction is a source of increased heat loss. As an example, a geared turbofan engine creates about twice as much heat loss as a non-geared turbofan engine. In addition, the weight of the engine increases due to the weight of the gear reduction.

It has typically been the case that a designer of a gas turbine engine sizes an oil tank such that the oil can sit in the oil tank long enough to de-aerate. On a normal turbofan engine, this had been approximately at least ten seconds.

SUMMARY OF THE INVENTION

In a featured embodiment, a gas turbine engine comprises a fan drive turbine for driving a gear reduction. The gear reduction drives a fan rotor. A lubrication system supplies oil to the gear reduction. The lubrication system includes a lubricant pump supplying a mixed air and oil to a deaerator inlet. The deaerator includes a separator that for separating oil, and delivering separated air to an air outlet, and for delivering separated oil back into an oil tank. The separator includes a member having lubricant flow paths on both of two opposed sides.

In another embodiment according to the previous embodiment, the separator has a splitter at an intermediate position in the inlet.

In another embodiment according to any of the previous embodiments, the air outlet has a tube extending downwardly into a deaerator shell.

In another embodiment according to any of the previous embodiments, an inlet velocity to the deaerator is less than or equal to 14 feet/second, and an exit velocity from the deaerator of the separated air is less than or equal to 14 feet/second.

In another embodiment according to any of the previous embodiments, a deaerator exit delivers oil into the oil tank at least 2 inches (5.08 centimeters) between a freestanding oil level within the tank.

In another embodiment according to any of the previous embodiments, a dwell time of oil in the tank as removed by the oil pump, on average, is five seconds or less.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

In another embodiment according to any of the previous embodiments, the gear reduction includes a sun gear for driving intermediate gears. Oil baffles are located circumferentially between the intermediate gears.

In another embodiment according to any of the previous embodiments, an oil capture gutter surrounds the gear reduction.

In another embodiment according to any of the previous embodiments, an oil capture gutter surrounds the gear reduction.

In another embodiment according to any of the previous embodiments, the separator includes a scroll spiraling from the inlet to a deaerator exit.

In another embodiment according to any of the previous embodiments, the exit includes a plurality of holes in a shell.

In another featured embodiment, method of designing a gas turbine engine includes providing a fan drive turbine for driving a gear reduction. The gear reduction drives a fan rotor. A lubrication system is provided to supply oil to the gear reduction, with an oil tank, the lubrication system including a lubricant pump. Mixed air and oil are delivered to a deaerator inlet, the deaerator including a separator for separating oil, and delivering separated air to an air outlet, and delivering separated oil back into an oil tank. The lubricant separator includes a member having lubricant flow paths on both of two opposed sides.

In another embodiment according to the previous embodiment, the separator is at an intermediate position in the inlet.

In another embodiment according to any of the previous embodiments, the air outlet has a tube extending downwardly into a deaerator shell.

In another embodiment according to any of the previous embodiments, the flow separator includes a scroll spiraling from the inlet to a deaerator exit.

In another embodiment according to any of the previous embodiments, the separator is at an intermediate position in the inlet.

These and other features may be best understood from the following drawings and specification.

DETAILED DESCRIPTION

Figure 1:
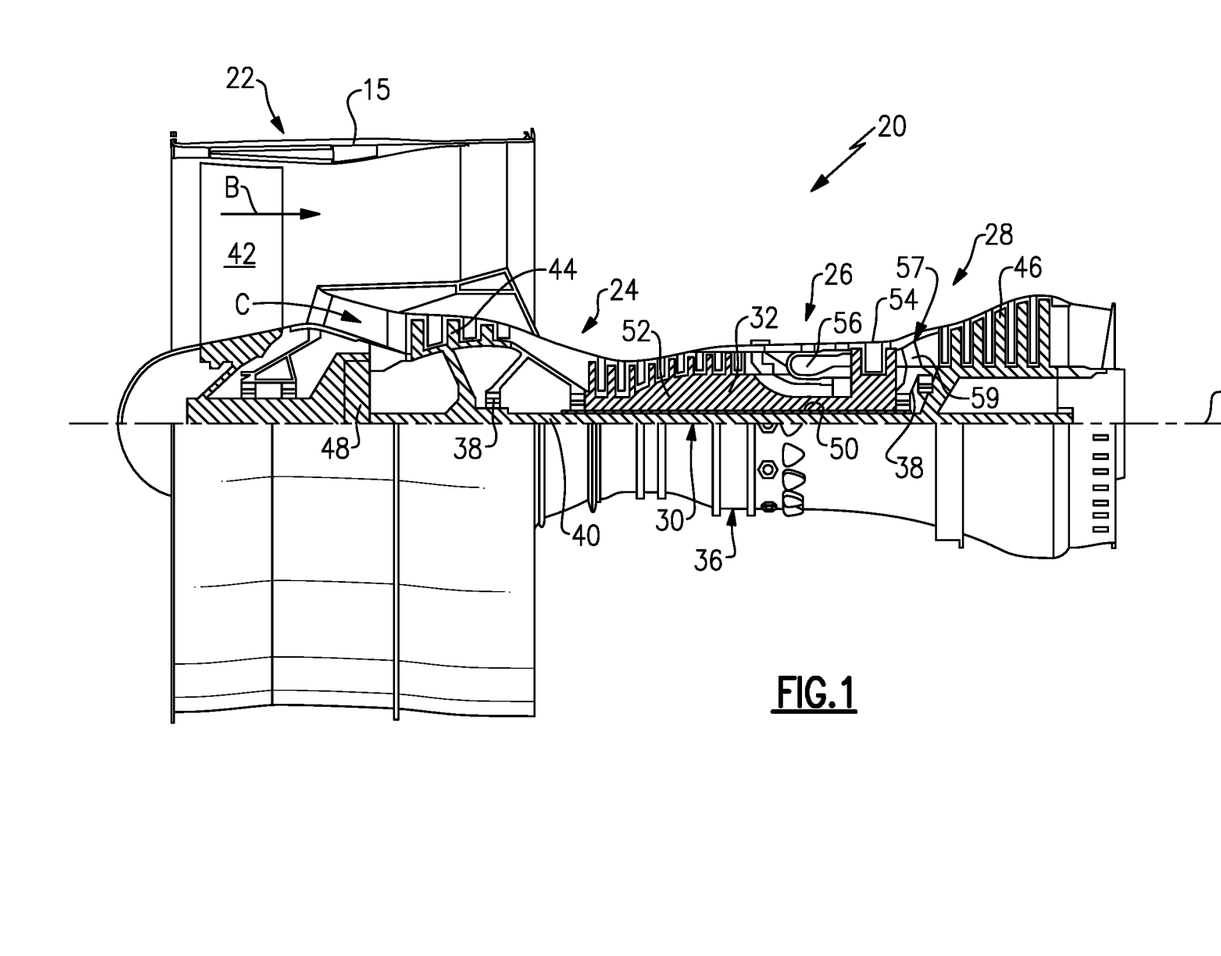
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than or equal to about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than or equal to about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram°R)/(518.7°R)]^{0.5}$. The "Low corrected fan tip speed" as disclosed herein according to one non-limiting embodiment is less than about 1150 ft/second.

Figure 2:
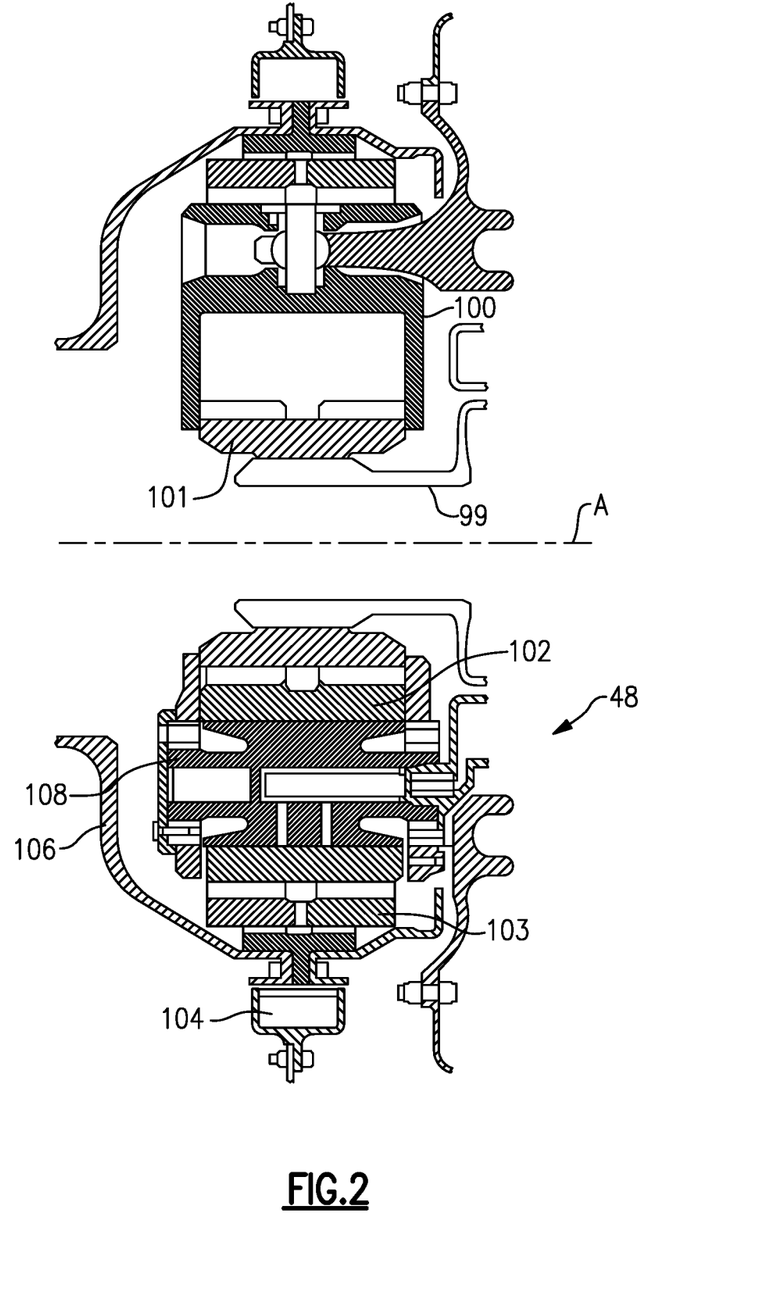
FIG. 2 shows a portion of a cross-section of a gear reduction.

As shown in FIG. 2, a flexible shaft 99, which is driven by the turbine 46, drives a sun gear 101 which, in turn, engages and drives intermediate gears 102. In some embodiments, the intermediate gears 102 may be planet gears of a planetary epicyclic gear system. In other embodiments, the intermediate gears 102 may be star gears of a star epicyclic gear system. The intermediate gears 102 engage and drive a ring gear 103 to, in turn, drive an output shaft 106, which then drives the fan rotor 42. In other embodiments, a planetary gear carrier (not shown) driven by planetary gears may drive the fan shaft. Lubricant is supplied to a journal pin 108, to the intermediate gears 102 and to other locations within the gear reduction 48.

Figure 3:
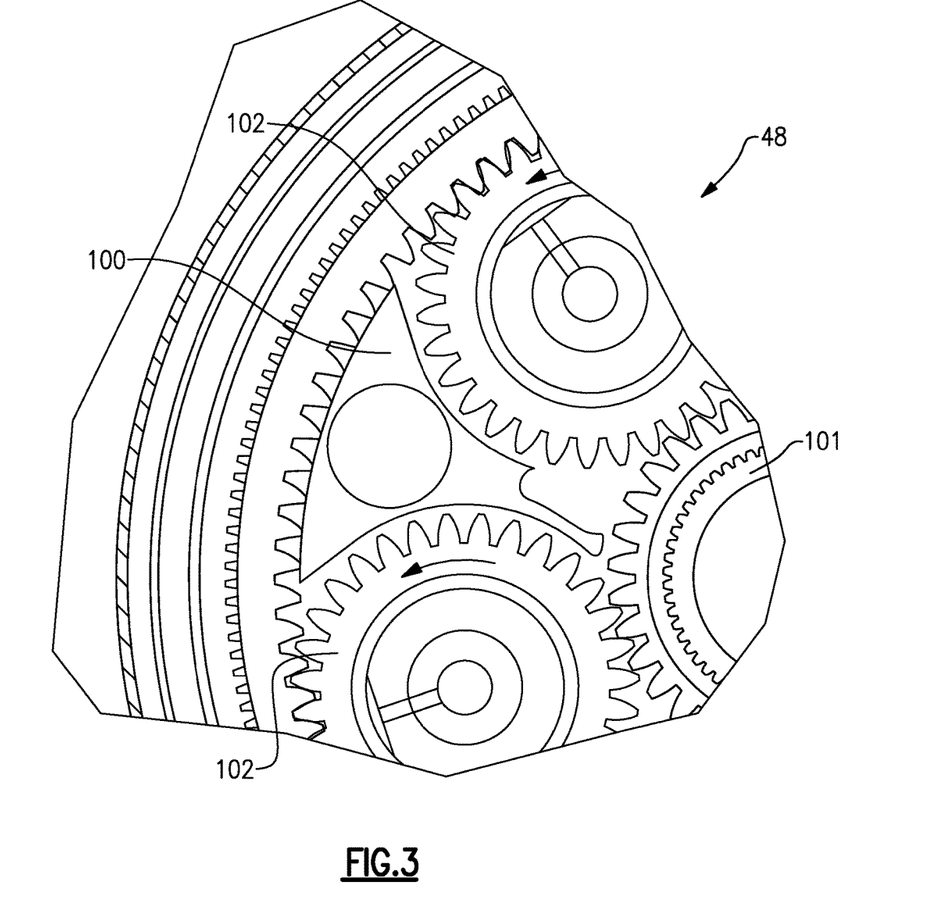
FIG. 3 shows another portion of a gear reduction.

FIG. 3 shows baffles 100 which are placed circumferentially between adjacent planet gears 102.

A gutter 104 surrounds the gear reduction 48 and captures oil that has left the gear reduction. Oil from the gear reduction 48 is returned to a pump 72 (See FIG. 4) or a tank 90 as shown schematically in FIG. 4. As shown, a lubricant system 70 includes the gear reduction 48 which may be structured as shown in FIGS. 2 and 3. Notably, complete details of the operation of the baffle, the gutter and the other portions of the gear reduction may be as disclosed in U.S. Pat. No. 6,223,616, the disclosure of which with regard to the operation of the gear reduction is incorporated by reference.

Figure 4:
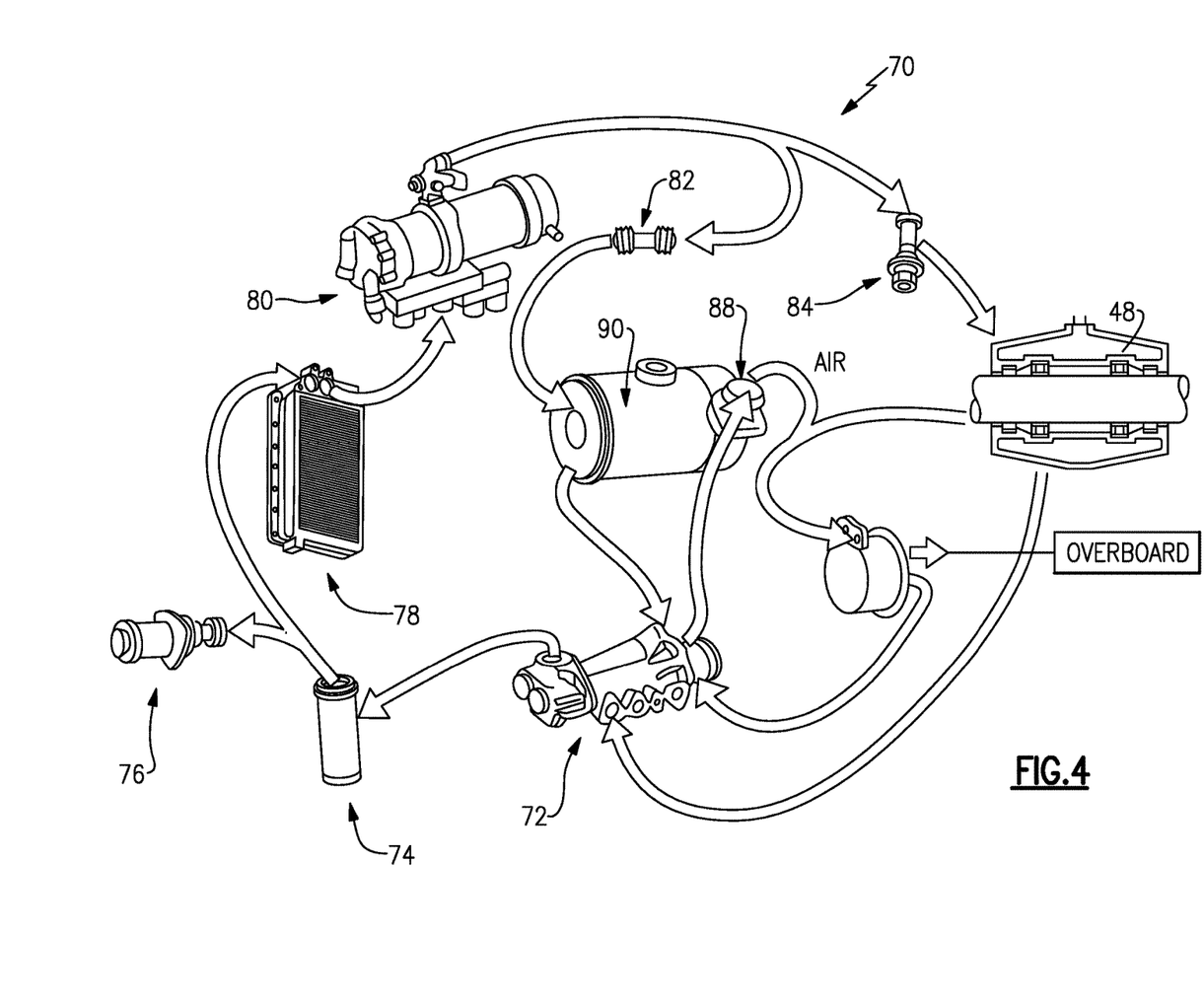
FIG. 4 shows a lubrication system.

Oil flows from an oil pump 72 to a filter 74 through a pressure relief valve 76 to an air/oil cooler 78 and then to a fuel/oil cooler 80. The oil may pass through an oil pressure trim orifice 82 and back to the tank 90. Alternatively, the oil may pass through a strainer 84 and then to the gear reduction 48. Oil returning from the gear reduction and, in particular, from the gutter, may pass back directly to the pump 72 or to the tank 90. This is a simplification of the overall lubricant system and, as appreciated, there may be other components.

Applicant has recognized that by utilizing baffles 100 and a gutter 104 on the gear reduction 48, which may be generally as disclosed in the above-mentioned U.S. patent, the oil need not sit in the oil tank for ten seconds in order to de-aerate. Thus, the size of the tank 90 may be made much smaller.

Conventional turbofans allow the oil to dwell in an oil tank for approximately seven to ten seconds. The dwell time allows air bubbles to separate from the oil to prevent foaming. With the move to a geared gas turbine engine, the oil flow volumes may effectively double. This would require a much larger oil tank, and as much as twice as large if the same dwell time is allowed. Thus, it becomes important to reduce dwell time.

Applicant has discovered that oil is de-aerated by the baffles 100 and gutter system and that a dwell time in the oil tank to remove air bubbles may be less than five seconds. More preferably, it may be less than or equal to about 3.0 seconds. This allows the use of oil tank 90 to be of a size roughly equivalent to the size utilized in prior non-geared gas turbine engines. A deaerator 88 is shown incorporated into the oil tank 90.

The better the deaeration before the oil reaches the tank, the shorter the dwell time that can be achieved. The disclosed deaerator achieves these very low dwell times.

As an example, an oil tank that holds 25 to 35 quarts of oil may be utilized on a geared gas turbine engine with 15,000 to 35,000 lbs in rated thrust at take-off. Further, an oil tank may be 35 quarts to 50 quarts of oil for an engine with 35,000 to 100,000 lbs in rated thrust at take-off.

Figure 5:
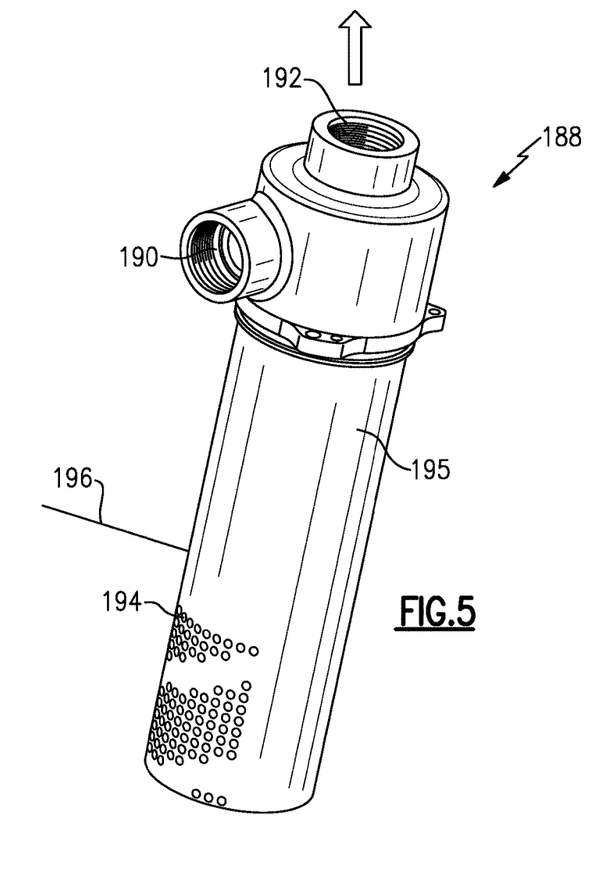
FIG. 5 shows a deaerator.

FIG. 5 shows a deaerator embodiment 188. A line 190 receives an air/oil mixture such as from the pump 72. Air leaves through an air outlet 192, as shown in FIG. 4.

A plurality of oil outlets 194 are shown in an outer shell 195 of the deaerator. An oil level 196 is shown schematically, and would be the oil level within the oil tank 90 of FIG. 4. Further, it can be appreciated that the inlet line 190, and the air outlet 192 are both above the oil level 196.

Figure 6:
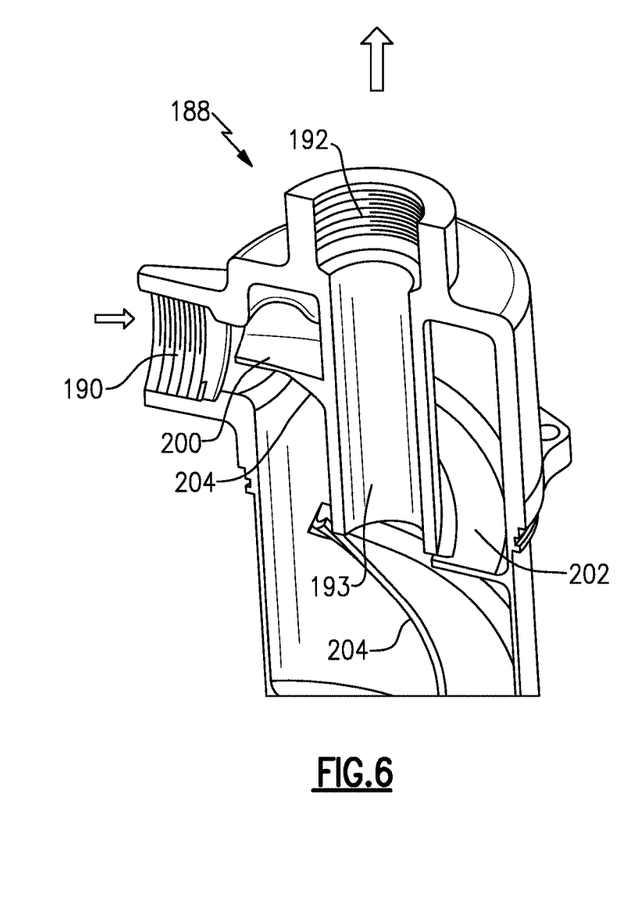
FIG. 6 shows internal structure of the deaerator.

As shown in FIG. 6, a flow splitter or separator 200 is provided inline to the inlet 190 and serves to split the air/oil flow into two paths, and at an intermediate location in inlet 190. This will hasten the deaeration of the mixed oil and air from the inlet 190. The air will be at the radially outer locations, and will pass through a tube 193 into the air outlet 192. As shown, air outlet 192 has an end 300 extending into a shell 302 of deaerator 188.

Figure 7:
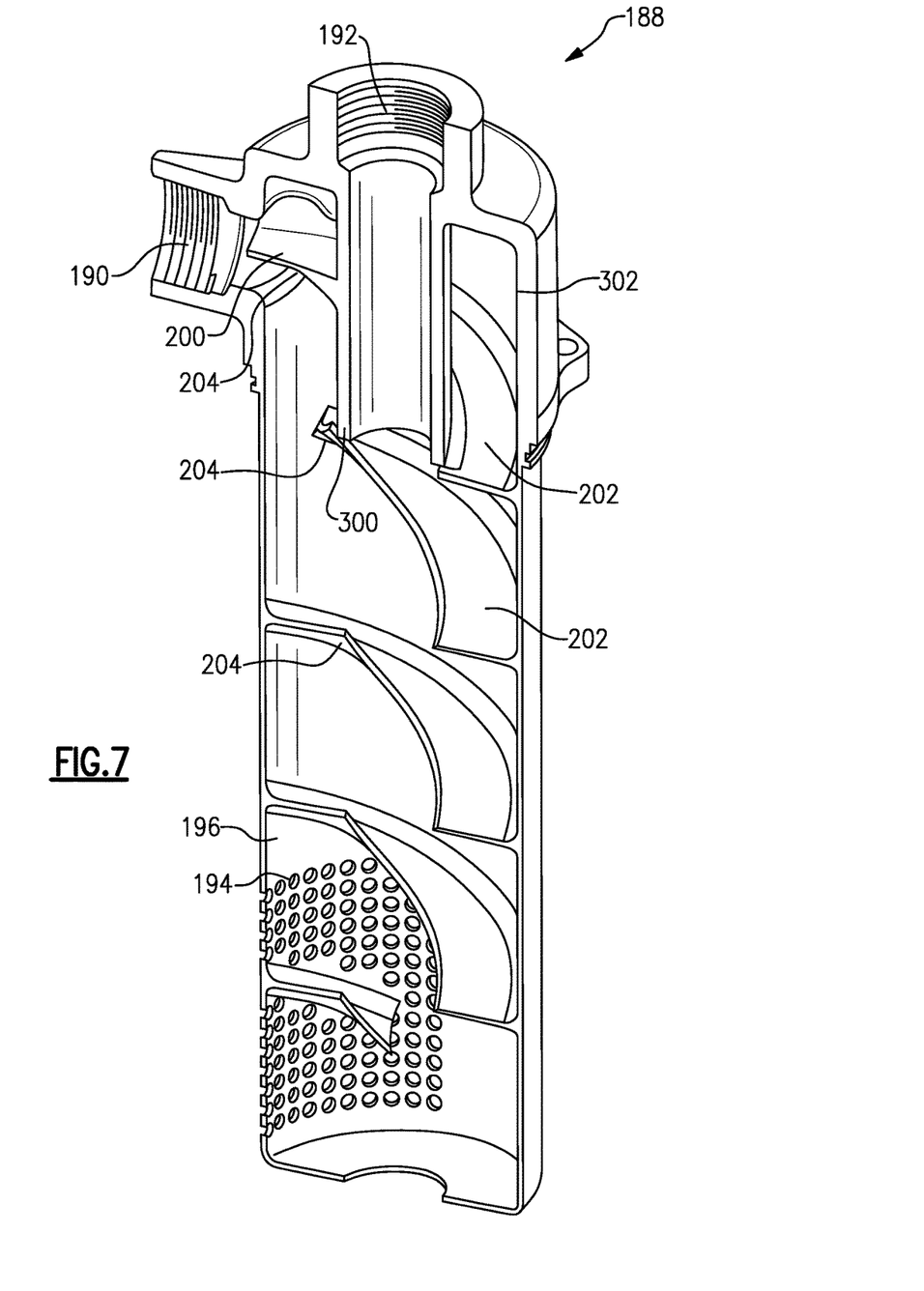
FIG. 7 shows additional internal structure of the deaerator.

As shown in FIG. 7, the oil will flow downwardly along an upper path 202 of a scroll or spiral, and along a lower path 204. Although shown as vertically upper and lower sides, other opposed side orientations may be used. The inventive deaerator more quickly removes the oil, and thus facilitates the dwell times as mentioned above.

A deaerator exit 194 delivers oil into the oil tank 90 at least 2 inches (5.08 centimeters) between a freestanding oil level 196 within the tank 90. An inlet velocity to the deaerator 188 may be less than or equal to 14 feet/second. An exit velocity from the deaerator 188 into the air outlet 192 may be less than or equal to 14 feet/second.

Applicant has found that introducing the oil and air mixture into an oil tank is much "quieter," resulting in less re-aeration when it is delivered at least two inches below a free surface. As an example, if the oil were sprayed into the free surface, this could cause splashing and foaming.

As to the velocity, high velocity oil and air mixtures entering the tank may cause re-aeration. The 14 feet/second is a very good goal to reduce the chances of re-aeration.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan drive turbine for driving a gear reduction, said gear reduction for driving a fan rotor;
a lubrication system for supplying oil to said gear reduction, the lubrication system including a lubricant pump supplying a mixed air and oil to a deaerator inlet, said deaerator including a separator for separating oil, and delivering separated air to an air outlet, and for delivering separated oil back into an oil tank, with said separator including a member having lubricant flow paths on both of two opposed sides; and
wherein said separator includes a scroll spiraling from said inlet to a deaerator exit.

2. The gas turbine engine as set forth in claim 1, wherein said exit includes a plurality of holes in a shell.

3. The gas turbine engine as set forth in claim 1, wherein a deaerator exit delivers oil into said oil tank at least 2 inches (5.08 centimeters) beneath a freestanding oil level within the tank.

4. A method of designing a gas turbine engine comprising:
providing a fan drive turbine for driving a gear reduction, said gear reduction for driving a fan rotor; and
providing a lubrication system for supplying oil to said gear reduction, with an oil tank, the lubrication system including a lubricant pump;
supplying a mixed air and oil to a deaerator inlet, said deaerator including a separator for separating oil, and delivering separated air to an air outlet, and delivering separated oil back into an oil tank, with said lubricant separator including a member having lubricant flow paths on both of two opposed sides; and
wherein said flow separator includes a scroll spiraling from said inlet to a deaerator exit.

5. The method as set forth in claim 4, wherein said separator is at an intermediate position in said inlet.

6. The method as set forth in claim 4, wherein said air outlet has a tube extending downwardly into a deaerator shell.

7. The method as set forth in claim 4, wherein said separator is at an intermediate position in said inlet.

\* \* \* \* \*